(12) United States Patent
Shimizu

(10) Patent No.: US 6,303,705 B1
(45) Date of Patent: Oct. 16, 2001

(54) METHOD FOR USING RUBBER PRODUCT OR RUBBER MEMBER

(75) Inventor: Kazutoyo Shimizu, Osaka (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 09/307,097

(22) Filed: May 7, 1999

(30) Foreign Application Priority Data

May 8, 1998 (JP) .................................................. 10-126079

(51) Int. Cl.⁷ ....................................................... C08F 8/00
(52) U.S. Cl. .................... 525/385; 525/324.3; 525/330.8; 525/332.8; 525/332.9; 525/333.1; 525/333.2
(58) Field of Search .............................. 525/385; 528/493

(56) References Cited

U.S. PATENT DOCUMENTS 4,961,954 * 10/1990 Goldberg et al. ........................ 427/2
5,238,504 * 8/1993 Henry ..................................... 134/40

FOREIGN PATENT DOCUMENTS

| 58-19464 | 1/1983 | (JP) . |
| 60-34973 | 8/1985 | (JP) . |
| 4-77529 | 3/1992 | (JP) . |

* cited by examiner

*Primary Examiner*—Bernard Lipman
(74) *Attorney, Agent, or Firm*—Knobb, Martens, Olson & Bear, LLP

(57) ABSTRACT

The present invention provides a method for using a rubber product or a rubber member in which at least one portion of the surface of the rubber product or the rubber member to be used in clean environments is allowed to swell by using a solvent, and then used. After at least one portion of the surface of the rubber product or the rubber member has been subjected to swelling by the solvent, it is used to handle electronic parts or the elements thereof; thus, a manufacturing method for electronic parts for manufacturing the electronic parts in clean environments is provided.

13 Claims, 2 Drawing Sheets

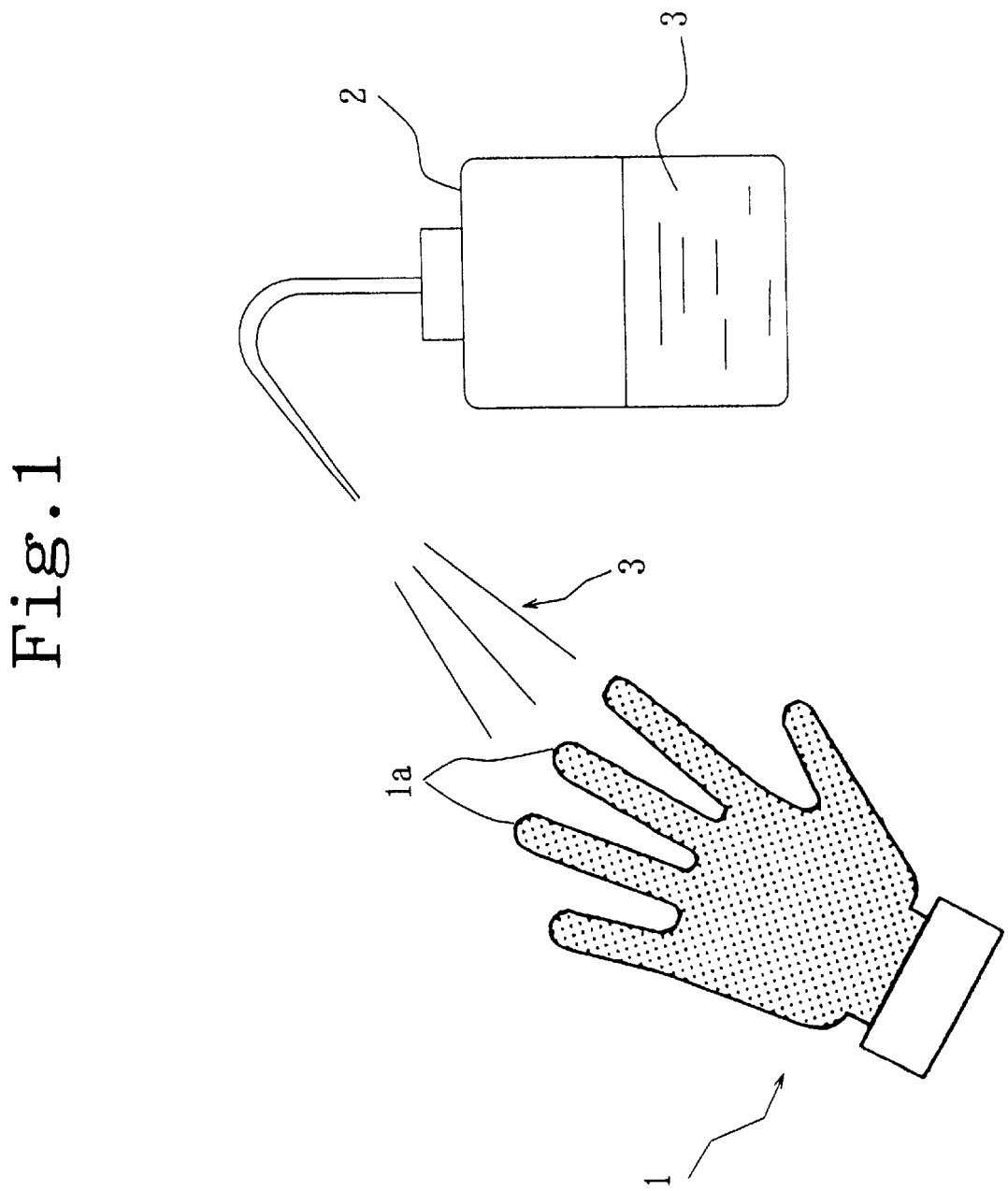

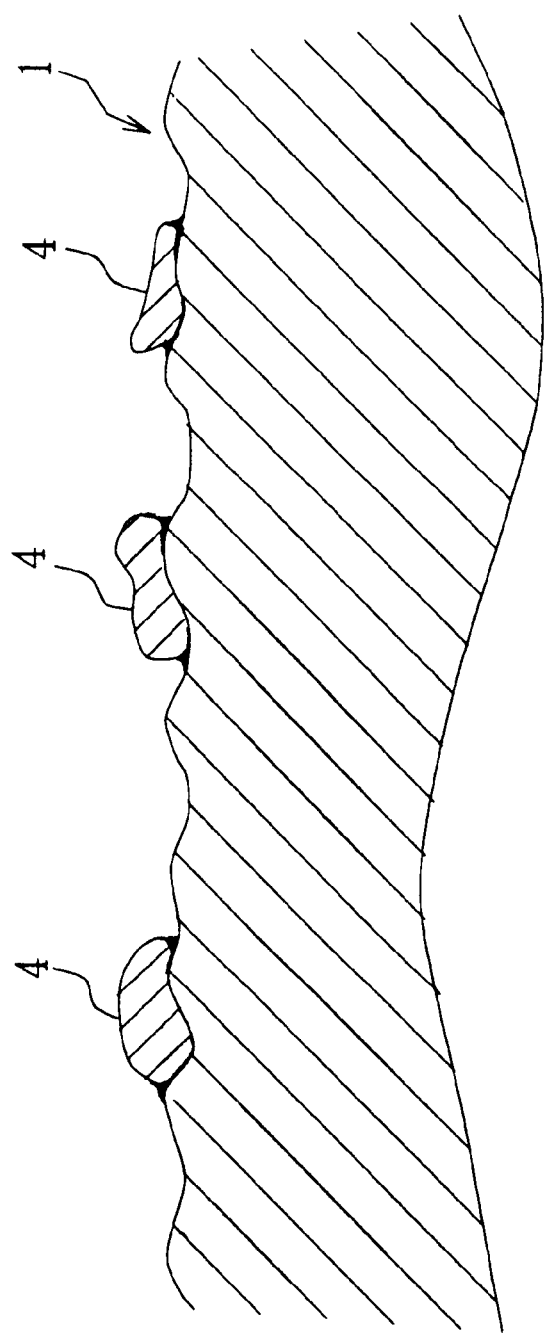

METHOD FOR USING RUBBER PRODUCT OR RUBBER MEMBER

BACKGROUND OF THE INVENTION

1. Field of the Invention

The present invention relates to a method for using a rubber product or a rubber member used in clean environments such as a clean room, and also concerns a manufacturing method for an electronic part using the same.

2. Description of the Related Art

Conventionally, in a clean room inside an electronic part manufacturing facility, etc., with respect to gloves for handling electronic parts or their elements, those made of natural rubber corresponding to Class 100, etc., are mainly adopted. Such rubber gloves have a problem in which they tend to cause a reduction in the yield in a sputtering process using them to handle substrates, etc. prior to the sputtering process, although contaminants have been removed therefrom by sufficiently washing them upon production. It is considered that the substrates are contaminated by re-adhesion of contaminants such as dusts that have adhered to the gloves.

However, although the inventors of the present application increased the number of glove exchanges in order to solve the above-mentioned problem, the situation was hardly improved. When contaminants, which were supposed to raise the problem, were analyzed, contaminants derived from calcium, sulfur, etc. generated from the gloves themselves were detected. Moreover, it has been revealed that silica or carbon-based contaminants, which have adhered to the rubber gloves upon their contact with electronic parts and their elements, re-adhere to the substrates, thereby causing the contamination.

However, the generation of these contaminants is inevitable when rubber materials such as natural rubber are used. Moreover, with respect to the contaminants adhered to the gloves upon their contact with electronic parts and their elements, even if improvements of the working environments are taken, there is a limitation in the reduction thereof. Although studies have been made on other rubber materials and substitute materials for the rubber materials, appropriate materials have not been found.

Here, not limited to rubber gloves, the above mentioned problem is a common problem which tends to arise in any rubber product and rubber member that are used in clean environments. Also with respect to the generation of contaminants from rubber materials themselves, the problem tends to arise even in rubber materials that are not subjected to direct contact upon handling.

Therefore, an object of the present invention is to provide a method of use for a rubber product or a rubber member which can prevent generation of contaminants from the rubber materials and also prevent re-adhesion of contaminants that have adhered thereto later on, and to provide a manufacturing method for electronic parts wherein such a method is adopted.

The inventors tried various modifications and treatments for the surface of a rubber material in order to achieve the above-mentioned object. As a result, we discovered the aforementioned objective could be achieved by a surprisingly simple method, that is, the surface of the rubber material is swelled by a suitable solvent, thereby completing the present invention.

SUMMARY OF THE INVENTION

More specifically, in one embodiment of the present invention, the method of use for a rubber product or a rubber member in clean environments of the present invention comprises the steps of allowing at least one portion of a surface of the rubber product or the rubber member to swell by using a solvent, and then using the rubber product or the rubber. Here, the term "to swell" means a state in which a rubber material absorbs a solvent to increase in volume. As a result, the level of the surface of the rubber material rises more than 1 $\mu$m, preferably more than 10 $\mu$m.

In the present invention, since at least one portion of the surface of a rubber product or a rubber member is brought into a swelled state by using a solvent, it is possible to prevent generation of contaminants from the rubber materials and also to prevent re-adhesion of contaminants thereto later on, as will be shown by the results of working examples described later. Although the reasons have not been revealed in detail, it is considered that a swelled rubber material makes it possible to prevent release, re-adhesion, etc. of contaminants generated from the rubber materials by its own adhesive force, and also to prevent re-adhesion of the contaminants by allowing contaminants externally adhering thereto to hold thereon while sticking by the adhesive force. Here, FIG. 2 shows a state in which contaminant 4 adhering to the surface of a rubber glove 1 is hardly released by the adhesive force of a swelled rubber material.

In the above-mentioned step, it is preferable to supply the above-mentioned solvent to the surface regularly. Thus, contaminants, which have adhered after the previous supply of the solvent, are allowed to hold on the rubber material by a new supply of the solvent, thereby making it possible to positively prevent the release and re-adhesion thereof.

With respect to the above-mentioned clean environments, various environments may be listed as will be described later; however, the present invention is more preferably applied to those environments in electronic parts manufacturing facilities. In this case, in the electronic parts manufacturing facilities which are susceptible not only to generation of contaminants from the rubber materials, but also to re-adhesion of contaminants that have adhered to the rubber materials from the electronic parts or the elements thereof, the present invention can solve both of the problems; therefore, the present invention functions more effectively. Consequently, for example, in semiconductor manufacturing processes or the like, it becomes possible to reduce contamination to substrates, etc., and consequently to improve the yield in the succeeding film-forming processes, etc.

Moreover, with respect to the rubber products and rubber members, those of various kinds are listed as will be described later; however, the present invention is preferably applied to products such as rubber gloves, suction-support members, transport supporting members and holding members. Since any of these products and members are used in clean environments and have a portion that is to be directly in contact with an object that should be maintained clean, the generation of contaminants from the rubber materials and re-adhesion of contaminants that have adhered to the rubber materials later on raise particularly great adverse effects; therefore, the present invention particularly functions effectively.

With respect to material rubbers for the above-mentioned rubber products or rubber members, not less than one kind selected from the following group is used: the group consists of natural rubber (NR), isoprene rubber (IR), styrene-butadiene rubber (SBR), butadiene rubber (BR), chloroprene rubber (CR), nitrile rubber (NBR), butyl rubber (IIR), ethylenepropylene rubber (EPM), urethane rubber (U), silicone rubber (Q), fluoro rubber (FKM), acrylic rubber (ACM, ANM), epichlorohydrin rubber (CO, ECO) and polysulfide rubber (T). Since any of these rubbers serves as a crosslinking rubber, it has an appropriate swelling due to a solvent, resulting in an appropriate adhesive property, and it is also less susceptible to elution of the rubber components.

The manufacturing method for electronic parts in clean environments of the present invention parts comprises the steps of allowing at least one portion of a surface of a rubber product or a rubber member to swell by using a solvent and then handling the electronic parts or the elements thereof. The manufacturing method of the present invention makes it possible to prevent generation of contaminants from the rubber materials and also to prevent re-adhesion of contaminants that have adhered thereto later on; therefore, it becomes possible to reduce contamination to the electronic parts or their elements, and consequently to improve the yield in each of the processes upon manufacturing the electronic parts.

BRIEF DESCRIPTION OF THE DRAWINGS

FIG. 1 is an explanatory drawing that shows a swelling process in example 1; and FIG. 2 is an explanatory drawing that shows a state of contaminant adhesion.

DETAILED DESCRIPTION OF THE PREFERRED EMBODIMENTS

Referring to Figures, the following description will discuss embodiments of the present invention in detail.

The rubber product or rubber member of the present invention is used in clean environments, and these clean environments include, in addition to the aforementioned electronic part manufacturing facilities, various facilities using clean rooms, clean booths, etc., such as precision mechanical equipment manufacturing facilities, bio-technology-related facilities, medical facilities, food production facilities, chemical production facilities and pure-water production facilities.

Besides various types of rubber gloves, examples of the rubber product include rubber plugs, rubber tubes, rubber hoses, etc. Moreover, examples of the rubber member include suction-support members, transport supporting members and holding members, which are used in various automatic apparatuses, as well as seal members, cushioning members, vibration isolating members, vibration damping members, etc. Here, these members include members that are coated with a rubber material only on their surface.

With respect to the method for swelling the surface of the rubber product or the like by using a solvent, various methods may be used; for example, a method for spraying a solvent from a washing bottle, a method in which the material is dipped into a solvent, or a method for spraying a solvent from a spray, may be adopted. In this case, if the solvent remains on the surface as droplets, the droplets might adhere to other members or the like and cause contamination; therefore, it is preferable to keep droplets of the residual solvent on the surface as little as possible. This is achieved by using a volatile solvent, absorbing and removing it with a cloth or the like that is free from dust generation, or forcefully drying the surface thereof by clean air.

With respect to the part to be subjected to swelling, it is preferable to apply the swelling to the entire surface, from the viewpoint of the prevention of contaminant generation; however, the swelling may be preferably applied to at least a portion that directly contacts an object that is to be handled and has to be kept clean.

With respect the method for regularly supplying the solvent onto the surface of the rubber, an appropriate time interval may be set by taking into account the amount of new contaminant adhesion. For example, the solvent may be supplied by any of the above-mentioned methods every 1 to 100 minutes, preferably 3 to 50 minutes. Moreover, the above-mentioned time interval may be set by taking into account the evaporation rate of the solvent. Furthermore, the solvent may be supplied, not on a time basis, but after every predetermined work.

Table 1 shows solvents used in the present invention in association with material rubbers.

TABLE 1

| Material rubber | Solvent |
| --- | --- |
| NR | Ketones, Acetates |
| IR | Ketones, Acetates |
| SBR | Ketones, Acetates |
| BR | Ketones, Acetates |
| CR | Ketones, Ethers |
| NBR | Acetates, Ethers, Aromatic hydrocarbons |
| IIR | Ethers, Aromatic hydrocarbons |
| EPM | Ethers, Aromatic hydrocarbons |
| U | Acetates, Aromatic hydrocarbons |
| Q | Ketones, Acetates, Ethers |
| FKM | Ethers, Trichlenes |
| ACM, ANM | Water |
| CO, ECO | Ethers, Alcohols |
| T | Acetates, Ethers, Aromatic hydrocarbons |

Among these, those materials having a low molecular weight (low number of carbon atoms) with an appropriate volatile property, such as, for example, acetone, methylethylketone, ethylacetate, petroleum ether, ethanol, trichlene, benzene and toluene, are preferably used since they hardly remain on the surface as droplets. In particular, acetone, one of the ketones, is preferably used since it is highly volatile and takes only a short time to dry up, making it possible to improve the operability by cutting waiting time, and since it is also easy to handle. Here, a plurality of the above-mentioned solvents may be used in a mixed manner.

In the manufacturing method for electronic parts of the present invention which utilizes the above-mentioned method of use of the present invention, the electronic parts are desirably manufactured in clean environments by handling the electronic parts or their elements after at least one portion of the surface of a rubber product or a rubber member has been subjected to swelling by a solvent. In this manufacturing method, any of conventional manufacturing methods for electronic parts, or conventional handling processes of the electronic parts or their elements can be adopted except for using the rubber materials swelled.

As for the electronic parts to be produced, examples include so-called semiconductor parts, such as integrated circuits (ULSI, VLSI, LSI, IC, etc.), photo-semiconductor elements and transistors, that require particularly clean environments, and various electronic parts constituting electronic circuits, together with all parts constituting electronic apparatuses, such as printed circuit boards, multi-layer circuit boards and batteries. Moreover, examples of the elements of electronic parts include various raw materials, elements, materials, intermediate products, etc. that constitute electronic parts.

EXAMPLE

The following description will discuss working examples, etc., showing specific processes and effects of the present invention.

Example 1

(Natural Rubber Glove)

A rubber glove, which had a composition of 90% by weight of natural rubber, 6% by weight of zinc oxide, 3% by weight of sulfur (curing agent) and 1% by weight of stearic acid (curing accelerator), was prepared. As illustrated in FIG. 1, acetone 3 is sprayed from a washing bottle 2 onto portion 1a (mainly finger portion) of the rubber glove 1 that contacts parts upon handling them. This was left in the air at room temperature for several tens seconds, and checked to see no droplets remained on the surface thereof. In an ordinary manner, this glove was used in handling alumina titanium carbide substrates in an insulating-film manufacturing process, and a sputtering process was carried out. The alumina titanium carbide substrates will be used for a substrate upon manufacturing process of a thin film magnetic head which is one of electronic parts. In this process, for example, the thin film magnetic head is formed with a magnetic element after forming multilayer including a insulation layer, an alloy layer, and the like by thin film growth technology such as a sputtering process.

As a result, the above-mentioned swelling treatment made it possible to reduce the number of contaminants ranging from 0.5 to 10 µm from approximately 100 to approximately 5 within one square centimeter on a substrate so that the yield after the sputtering process was greatly improved (approximately two times as compared with comparative example 1). In other words, by allowing the surface of the rubber glove to swell, even if contaminants were released from the glove itself or contaminants adhered thereto from substrates, etc., during work, the glove did not let the contaminants separate therefrom, causing no contamination to the alumina titanium carbide substrates.

Here, the above-mentioned treatment to the glove, which exhibited great effects in the manufacturing processes for electronic part using alumina titanium carbide substrates, is considered to be applicable to all cases for manufacturing parts, etc., by using rubber materials.

Comparative Example 1
(No Swelling)

The same method and processes as Example 1 were carried out except that no swelling treatment by acetone was applied, and then a sputtering process was carried out. As a result, contaminants in number of approximately 100 within 1 square centimeter were observed, and the yield was approximately one-half that of Example 1.

Example 2
(Nitrile Rubber Glove)

The same method and processes as Example 1 were carried out except that, instead of the natural rubber glove, a nitrile rubber glove having the following composition was used and, instead of acetone, benzene was used, and then, a sputtering process was carried out. As a result, in the same manner as Example 1, it was possible to reduce contaminants ranging from 0.5 to 10 µm in number, that is, from approximately 100 to approximately 5 within one square centimeter so that the yield after the sputtering process was greatly improved (approximately two times as compared with comparative example 1).
(Composition of Nitrile Rubber)

Nitrile rubber: 90% by weight, Zinc oxide: 6% by weight, Sulfur (curing agent): 3% by weight, Stearic acid (curing accelerator): 1% by weight.

What is claimed is:

1. A method for preventing release of sulfur from a surface of a rubber product or rubber member used in a clean environment, said rubber product or rubber member including the sulfur as a curing agent, which method comprises the steps of: (a) selecting a solvent for treating the surface of the rubber product or rubber member, said solvent being capable of causing the surface to swell; (b) spraying the solvent on the surface in an amount effective to cause the surface to swell but not to maintain droplets thereon, whereby the sulfur remains on the surface; (c) evaporate the solvent from the surface; and (d) repeating steps (b) and (c) when the surface is no longer swelled.

2. The method according to claim 1, wherein the clean environment is an environment of an electronic part manufacturing facility.

3. The method according to claim 1, wherein the rubber product or rubber material is a rubber glove, a suction-support member, a transport supporting member, or a holding member.

4. The method according to claim 1, wherein the rubber product or rubber member is made of at least one material selected from the group consisting of natural rubber, isoprene rubber, styrene-butadiene rubber, butadiene rubber, chloroprene rubber, and nitrile rubber.

5. The method according to claim 1, wherein the solvent is made of at least one material selected from the group consisting of acetone, methylethylketone, ethylacetate, petroleum ether.

6. The method according to claim 1, wherein the rubber member is a rubber glove made of natural rubber, and the solvent is acetone.

7. A method for preventing physical transfer of sulfur from a surface of a rubber product or rubber member used in a clean environment to an object in contact with the rubber product or rubber member, said rubber product or rubber member including the sulfur as a curing agent, which method comprises the steps of: (a) selecting a solvent for treating the surface of the rubber product or rubber member, said solvent being capable of causing the surface to swell; (b) spraying the solvent on the surface in an amount effective to cause the surface to swell but not to maintain droplets thereon, whereby the sulfur remains on the surface; (c) evaporate the solvent from the surface; and (d) contacting the object with the swelled surface of the rubber product or rubber member.

8. The method according to claim 7, wherein the clean environment is an environment of an electronic part manufacturing facility.

9. The method according to claim 7, wherein the object is an electronic product.

10. The method according to claim 7, wherein the rubber product or rubber material is a rubber glove, a suction-support member, a transport supporting member, or a holding member.

11. The method according to claim 7, wherein the rubber product or rubber member is made of at least one material selected from the group consisting of natural rubber, isoprene rubber, styrene-butadiene rubber, butadiene rubber, chloroprene rubber, and nitrile rubber.

12. The method according to claim 7, wherein the solvent is made of at least one material selected from the group consisting of acetone, methylethylketone, ethylacetate, petroleum ether.

13. The method according to claim 7, wherein the rubber member is a rubber glove made of natural rubber, and the solvent is acetone.

* * * * *